Sept. 3, 1963.   HANNS-DIETER PASCHKE   3,102,682
LIQUID COOLING FOR THE ROTOR OF A ROTATING-PISTON ENGINE
Filed Jan. 12, 1962   3 Sheets-Sheet 1

*INVENTOR.*
HANNS-DIETER PASCHKE
BY Raymond P. Wallace

AGENT

Sept. 3, 1963  HANNS-DIETER PASCHKE  3,102,682
LIQUID COOLING FOR THE ROTOR OF A ROTATING-PISTON ENGINE
Filed Jan. 12, 1962  3 Sheets-Sheet 3
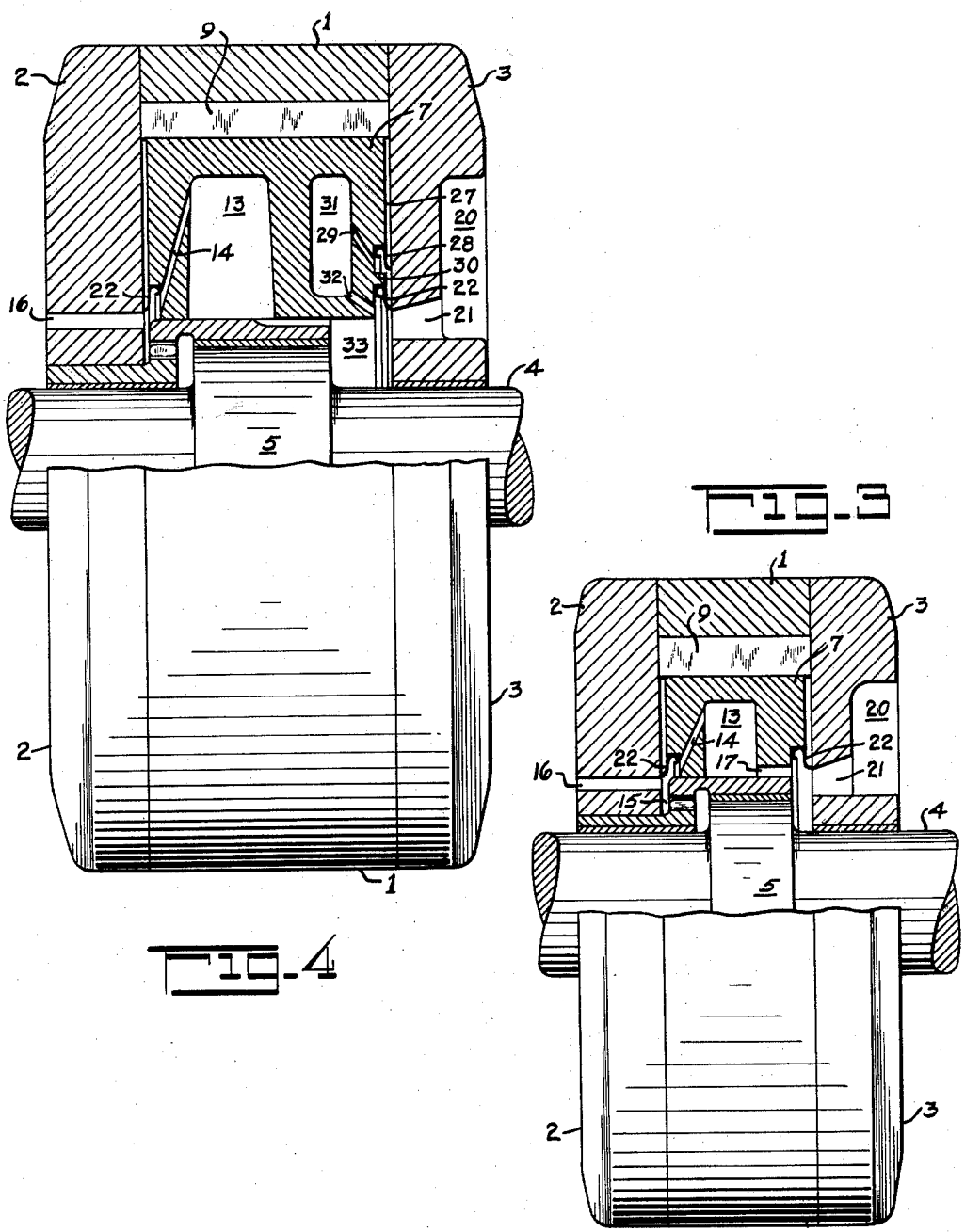
INVENTOR.
HANNS-DIETER PASCHKE
BY Raymond P. Wallace
AGENT

United States Patent Office 3,102,682
Patented Sept. 3, 1963

3,102,682
LIQUID COOLING FOR THE ROTOR OF A
ROTATING-PISTON ENGINE
Hanns-Dieter Paschke, Wurttemberg, Germany, assignor to NSU Motorenwerke Aktiengesellschaft, Neckarsulm, and Wankel G.m.b.H., Lindau (Bodensee), Germany
Filed Jan. 12, 1962, Ser. No. 165,799
Claims priority, application Germany Feb. 10, 1961
6 Claims. (Cl. 230—145)

This invention relates to liquid cooling for the rotor or inner body of a rotating-piston engine in which the piston is so mounted as to rotate on a rotating eccentric and makes a planetary circulating movement relative to the external housing. More particularly, the invention is directed to cooling means in which the coolant liquid is circulated by centrifugal forces in the rotor.

In the prior art, engines of this type have had rotors provided with an internal chamber, through which a cooling liquid was pumped. The principal object of the present invention is the effecting of movement of the cooling liquid through the rotor by centrifugally generated accelerating forces which during the rotation of the rotor act on the liquid and change its direction of flow.

For this purpose the rotor is provided with a number of separate internal chambers, each chamber having a channel for supplying cooling liquid, communicating with the chamber through an orifice disposed near the radially outermost boundary of the chamber, and a channel for draining the chamber, running from the radially innermost boundary to a coolant-collecting cell. By this form of construction, when there are radially outwardly directed acceleration forces on the rotor the cooling liquid is thrown into the hollow chambers, and when there are radially inwardly directed acceleration forces the cooling liquid is forced radially inward and is conveyed through the drain channels to the collecting cell. The coolant can be recovered from the collecting space or conveyed therefrom in any desired manner.

In addition to the conveyance of the cooling liquid without pressure, the invention has the further advantage of eliminating to a large extent the energy losses and generation of heat in the liquid which would be caused by churning and turbulence of the liquid in a rotor having only a single internal chamber; the provision in the invention of a plurality of small chambers obviates churning any large body of liquid.

The collecting cell may, if desired, be disposed in an adjacent end plate of the rotor housing. However, it is particularly advantageous to dispose the collecting cell in the rotor and to remove the coolant from the rotor at that place. For this purpose there may be disposed in the collecting cell a disk provided with radial channels, for example; such a disk and its manner of operation are described in the inventor's co-pending application Cooling System for Rotary Mechanisms, Serial No. 21,989, filed April 13, 1960.

Leakage of the cooling liquid into the operating chambers through the gap between the rotor face and the adjacent end wall of the housing can to a great extent be avoided by a seal ring installed in the end face of the rotor and bearing against the housing wall. In order to relieve the seal ring as far as possible from the pressure of the liquid, the supply channels to the rotor chambers run from an area radially inside the seal ring and as close as possible thereto. Sealing can be still further improved when the opposite end of the rotor has installed therein a pair of seal rings, with the drain channels from the rotor chambers discharging inside the innermost seal ring, and by-pass channels disposed between the two rings to catch any leakage past the inner ring and divert it back to the drain channels. By this means, only a small amount of leakage will reach the outer seal ring, and by means of outwardly directed acceleration forces will be carried away through the by-pass channels and re-directed into the drain channels.

It is therefore an object of this invention to provide a rotary piston engine having internal cooling means for the rotor.

It is another object to provide cooling means actuated by acceleration forces.

A further object of the invention is to provide cooling means for the interior of a rotor having separate internal chambers.

Yet another object is to provide coolant flow through the interior of such a rotor with means for preventing leakage into the working chambers.

The foregoing objects and others ancillary thereto will be readily understood on reading the following specification in connection with the appended drawings, in which—

FIGURES 3 and 4 show rotary piston engines partly in longitudinal section, similar to FIGURE 1, and presenting further embodiments of the invention.

Figure 1:
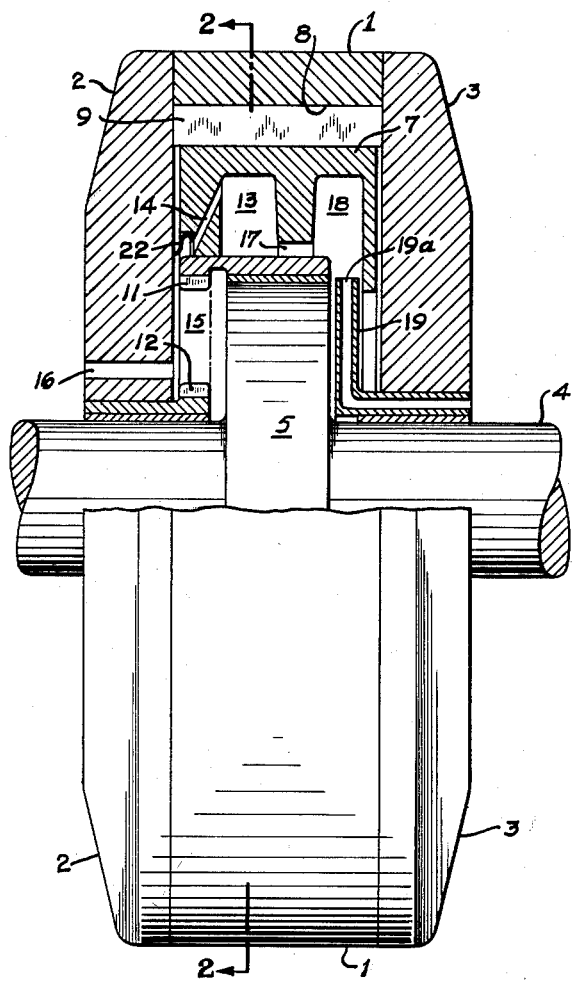
FIGURE 1 shows a rotary piston engine partly in longitudinal section and embodying the invention.
Figure 2:
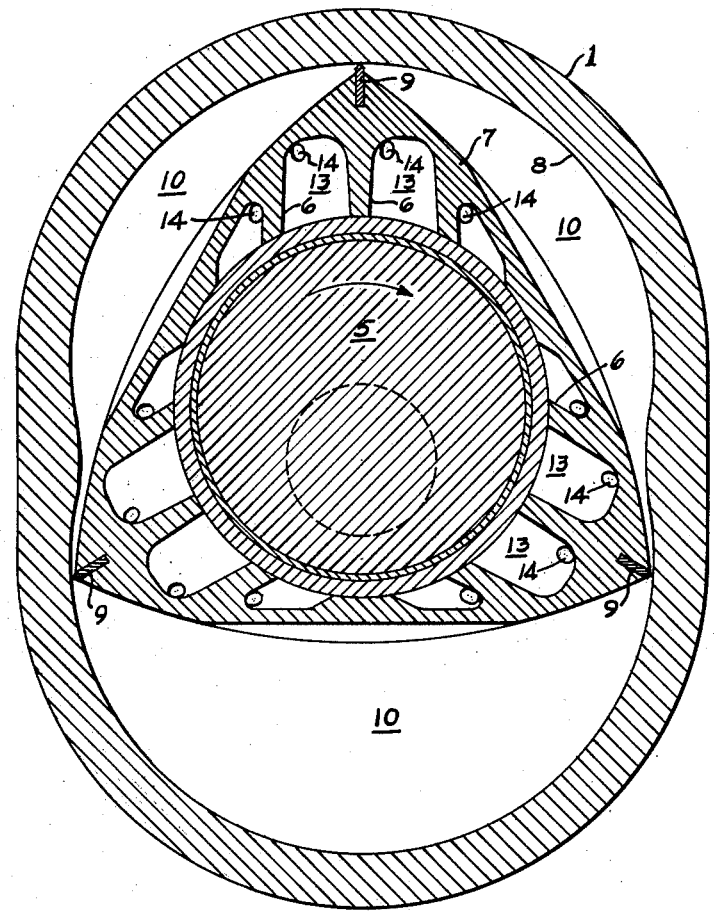
FIGURE 2 is a transverse cross-section taken on line 2—2 of FIGURE 1.

In FIGURES 1 and 2 there is shown a rotary piston engine having an external housing comprising a middle or peripheral housing 1 and a pair of end plates 2 and 3. A crankshaft 4 is rotatably mounted in the end plates and is provided with an eccentric 5 upon which there is rotatably mounted a rotor 7 disposed within the housing. The inner contour of the middle housing 1 is multi-curved in cross-section transversely of the crankshaft, preferably having the form of a two-lobed epitrochoid. The rotor is generally triangular in shape, having convexly arcuate sides, and during rotation its apexes sweep along contour 8 in continuous contact therewith and in sealing relation thereto; radially movable sealing members 9 may be suitably mounted at the apexes.

As a result of the rotation of the rotor within the epitrochoidal housing, there are formed three variable-volume chambers 10, inside which, by means of a suitable arrangement of intake and exhaust ports (not shown), a four-stroke engine cycle can be carried out. For the purpose of indexing or registering the position of the rotor with respect to the epitrochoidal surface, there is provided gearing comprising an internally-toothed ring gear 11 mounted on the rotor and meshing with a spur gear 12 mounted on the end plate 2. This gearing arrangement does not drive or impart torque to the shaft, but removes the positioning load which would otherwise be placed upon the apex portions of the rotor.

Rotor 7 is liquid-cooled. For the purpose of effecting movement of the cooling liquid through the rotor without a pump, use is made of the alternating acceleration forces exerted on the rotor by its planetary circulating motion. The rotor is provided with a plurality of internal chambers 13 separated from one another by septa 6, each of these chambers being in communication by means of one of the supply channels 14 through the rotor wall with an annular reservoir 15 at one end of the rotor and surrounding the shaft; coolant may be supplied to the reservoir by means of a conduit 16 through one end plate, or by other convenient means. Channels 14 are disposed in the rotor running generally radially outward, having their inward ends communicating with the reservoir and their outward ends communicating with chambers 13 at the radially outermost portion of the chambers. The coolant from the reservoir, by means of the acceleration forces acting radially outward, is hurled through channels 14 into chambers 13. The rotor chambers 13 are provided with drain channels 17 at their radially inward portions, the drain channels emptying into a common collecting cell 18 in the rotor, surrounding the shaft at the opposite end of the rotor from the reservoir. Thus, when the rotor motion reaches the region in which inwardly directed acceleration forces act, the coolant in chambers 13 is forced radially inward and passes through channels 17 into the collecting cell. Flowback through channels 14 is not possible, since these channels empty into the internal chambers at the outer boundaries thereof. The coolant is carried away from the collecting cell in any desired manner. In the embodiment here shown, there is provided for this purpose a stationary plate 19 having radial channels 19a, which is described in application Serial No. 21,989 referred to above.

For the purpose of preventing leakage of the cooling liquid into the working chambers through the gap between the housing end plate 2 and the adjacent face of the rotor, there is disposed in this rotor face a resilient seal ring 22 having sliding contact with the housing end wall. In order that the seal ring may be relieved of fluid pressure as far as possible, the passages 14 run radially outwardly from a location near the ring, so that a well of fluid cannot be built up against it.

In FIGURE 3 there is shown a slightly different embodiment, in which a collecting cell 20 is provided in end plate 3 instead of in the rotor. Flow of liquid through the rotor is effected in the same way as in the previous embodiment, but drain channels 17 have their vents in the vicinity of passages 21 in the end plate communicating with collecting cell 20. From this collecting cell the liquid may be drawn off in any desired manner and passed through heat exchangers, filters, etc., back to suppply channel 16. In this embodiment a seal ring 22 is disposed in each face of the rotor, passages 21 being disposed radially inward of the adjacent seal ring.

FIGURE 4 shows a further embodiment utilizing the same principle for the flow of cooling liquid through the rotor as in previous examples, and having the collecting cell also disposed in the end plate 3. In addition there is provided, between end plate 3 and the adjacent rotor face 27, a double seal arrangement with which the alternating acceleration forces acting on the rotor are used to prevent to a great extent the leakage of liquid through the gap between the face of the rotor and the adjacent end plate.

For this purpose the rotor face 27 is provided with a seal ring 22 as in the embodiment of FIGURE 3, and in an annular cavity 30 in the rotor face external to the first seal ring is positioned a second seal ring 28. The first seal ring is never completely leakproof, but it throttles the flow of liquid in the radially outward direction so that only a very small amount of leakage reaches cavity 30. The rotor is provided with a second set of internal chambers 31 for scavenging such leaking oil, communicating with cavity 30 by channels 29 running radially outward therefrom, and having drain channels 32 opening radially inward of the innermost seal ring. Thus, during one portion of the rotor cycle any oil reaching cavity 30 will be thrown by acceleration forces into chambers 31, and during a subsequent portion of the cycle will be evacuated from the scavenging chambers through channels 32 back into the interim collecting cell 33. There being no oil pressure on ring 28, this sealing system works perfectly.

What is claimed is:

1. A rotary piston engine having a hollow outer body comprising a middle housing with a basically epitrochoidal inner surface and a pair of end plates closing said housing, said housing having a longitudinal axis, an inner body disposed within said outer body and having an axis parallel to said housing axis but displaced therefrom, said inner body having end faces parallel with said end plates and adjacent thereto and being rotatable about its own axis while said inner body axis describes a planetary motion about said housing axis, whereby acceleration forces are generated in said inner body successively in a plurality of directions, said inner body having a plurality of internal chambers and having a plurality of generally radially disposed coolant supply channels, each of said supply channels having an intake opening at its radially inward end on the surface of said inner body and communicating at its radially outward end with the interior of one of said chambers near the outer periphery thereof, each of said chambers having a drain channel communicating with the interior of said chamber near the inner periphery thereof and communicating with the exterior of said inner body, whereby a coolant liquid supplied to the intakes of the supply channels will be alternately thrown into said chambers and drained therefrom by said successive acceleration forces.

2. The combination recited in claim 1, in which said inner body has disposed therein a collecting cell for said coolant liquid drained from said chambers.

3. The combination recited in claim 2, in which there is disposed in said collecting cell a radially channeled plate for conducting liquid therefrom.

4. The combination recited in claim 1, in which there is disposed between one of said inner body end faces and the adjacent housing end plate an annular seal radially outside said intake openings of said supply channels.

5. The combination recited in claim 4, in which there is disposed between the opposite inner body end face and its adjacent housing end plate a first annular seal radially outside the outlets of said drain channels, and a second annular seal surrounding said first seal.

6. The combination recited in claim 1, in which one of said end plates has disposed therein a collecting cell for said coolant liquid drained from said inner body.

No references cited.